US012091988B2

(12) United States Patent
Takamura et al.

(10) Patent No.: US 12,091,988 B2
(45) Date of Patent: Sep. 17, 2024

(54) GAS TURBINE BLADE

(71) Applicant: MITSUBISHI HEAVY INDUSTRIES, LTD., Tokyo (JP)

(72) Inventors: Keita Takamura, Yokohama (JP); Satoshi Hada, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/026,732

(22) PCT Filed: Sep. 21, 2021

(86) PCT No.: PCT/JP2021/034568

§ 371 (c)(1), (2) Date: Mar. 16, 2023

(87) PCT Pub. No.: WO2022/080094

PCT Pub. Date: Apr. 21, 2022

(65) Prior Publication Data

US 2023/0340881 A1 Oct. 26, 2023

(30) Foreign Application Priority Data

Oct. 16, 2020 (JP) ................................ 2020-174743

(51) Int. Cl.
*F01D 5/18* (2006.01)

(52) U.S. Cl.
CPC ............ *F01D 5/18* (2013.01); *F05D 2220/32* (2013.01); *F05D 2260/20* (2013.01)

(58) Field of Classification Search
CPC ..... F01D 5/18; F05D 2220/32; F05D 2260/20
See application file for complete search history.

(56) References Cited

U.S. PATENT DOCUMENTS 4,946,346 A * 8/1990 Ito ........................... F01D 5/189 415/115
6,071,075 A * 6/2000 Tomita .................... F01D 5/187 416/97 R (Continued)

FOREIGN PATENT DOCUMENTS

EP 2610435 A1 * 7/2013 ............. F01D 5/187
JP 2-11801 1/1990

(Continued)

OTHER PUBLICATIONS

International Search Report issued Nov. 22, 2021 in International (PCT) Application No. PCT/JP2021/034568, with English translation.

(Continued)

*Primary Examiner* — David E Sosnowski
*Assistant Examiner* — Theodore C Ribadeneyra
(74) *Attorney, Agent, or Firm* — Wenderoth, Lind & Ponack, L.L.P.

(57) ABSTRACT

This gas turbine blade comprises a platform part having a cooling passage formed inside, and a wing body part protruding from the upper surface of the platform part. A plurality of first ejection ports that eject a gas supplied from the cooling passage are formed in an inner chordal region of the upper surface, which is positioned further toward the wing-body side than a wing chord connecting the leading edge and the trailing edge of the wing body part. A plurality of second ejection ports that eject the gas supplied from the cooling passage are formed in an outer chordal region of the upper surface, which is positioned on the side opposite the inner chordal region with respect to the wing chord. The outer chordal region has an outer chordal leading edge region positioned on the leading-edge side and an outer chordal trailing edge region positioned on the trailing-edge side, more second ejection ports being formed in the outer (Continued)

chordal leading edge region than in the outer chordal trailing edge region.

8 Claims, 6 Drawing Sheets

(56) References Cited

U.S. PATENT DOCUMENTS

| | | | | |
|---|---|---|---|---|
| 2009/0202339 | A1 | 8/2009 | Torii et al. | |
| 2012/0107135 | A1* | 5/2012 | Harris, Jr. ............... | F01D 5/187 29/889.721 |
| 2012/0263603 | A1* | 10/2012 | Hada ........................ | F01D 5/187 416/97 R |
| 2016/0177751 | A1 | 6/2016 | Otomo et al. | |

FOREIGN PATENT DOCUMENTS

| | | |
|---|---|---|
| JP | 8-144704 | 6/1996 |
| JP | 2008-95697 | 4/2008 |
| JP | 2008-202547 | 9/2008 |
| JP | 2012-102726 | 5/2012 |
| JP | 2016-11616 | 1/2016 |

OTHER PUBLICATIONS

International Written Opinion issued Nov. 22, 2021 in International (PCT) Application No. PCT/JP2021/034568, with English translation.

* cited by examiner

GAS TURBINE BLADE

TECHNICAL FIELD

The present disclosure relates to a gas turbine blade.

This application claims the right of priority based on Japanese Patent Application No. 2020-174743 filed with the Japan Patent Office on Oct. 16, 2020, the content of which is incorporated herein by reference.

BACKGROUND ART

A gas turbine blade has a plate-like platform part and a blade main body part extending from an upper surface of the platform part. A cooling passage through which compressed air as a cooling medium flows is formed inside the platform part. An end portion of the cooling passage is open on the upper surface or a side end surface of the platform part or on a surface of the blade main body part.

As a specific example of such a cooling passage, the technique described in Japanese Unexamined Patent Application Publication No. 2012-102726 (hereinafter, JP ’726) is known. In the gas turbine blade according to JP ’726, opening end portions of the cooling passages are uniformly formed on a pressure surface (pressure surface) side of a blade main body part.

Here, in a partial region of a platform away from the blade main body part (specifically, a part of a region outside a blade chord connecting a leading edge and a trailing edge of the blade main body part) in the upper surface of the platform, the thickness thereof is thin as compared to a region in the vicinity of the blade main body part, so that thermal stress due to a high-temperature combustion gas easily occurs. There is a concern that forming many opening end portions of the cooling passages in such a region may lead to a decrease in the fatigue strength of the platform. That is, there is still room for improvement in the technique described in JP ’726.

SUMMARY OF THE INVENTION

The present disclosure has been made to solve the above problem, and has an object to provide a gas turbine blade having further improved fatigue strength.

Solution to Problem

In order to solve the above problem, a gas turbine blade according to the present disclosure includes: a platform part having a cooling passage formed inside; and a blade main body part protruding from an upper surface of the platform part, wherein a plurality of first ejection ports that eject a gas supplied from the cooling passage are formed in a chord inside region of the upper surface, which is located on a blade main body part side with respect to a blade chord connecting a leading edge and a trailing edge of the blade main body part, a plurality of second ejection ports that eject the gas supplied from the cooling passage are formed in a chord outside region of the upper surface, which is located on a side opposite the chord inside region with the blade chord as a reference, the chord outside region has a chord outside leading edge region that is located on a leading edge side, and a chord outside trailing edge region that is located on a trailing edge side, and the plurality of second ejection ports are formed more on the chord outside leading edge region than on the chord outside trailing edge region.

According to the present disclosure, it is possible to provide a gas turbine blade having further improved fatigue strength.

Figure 1:
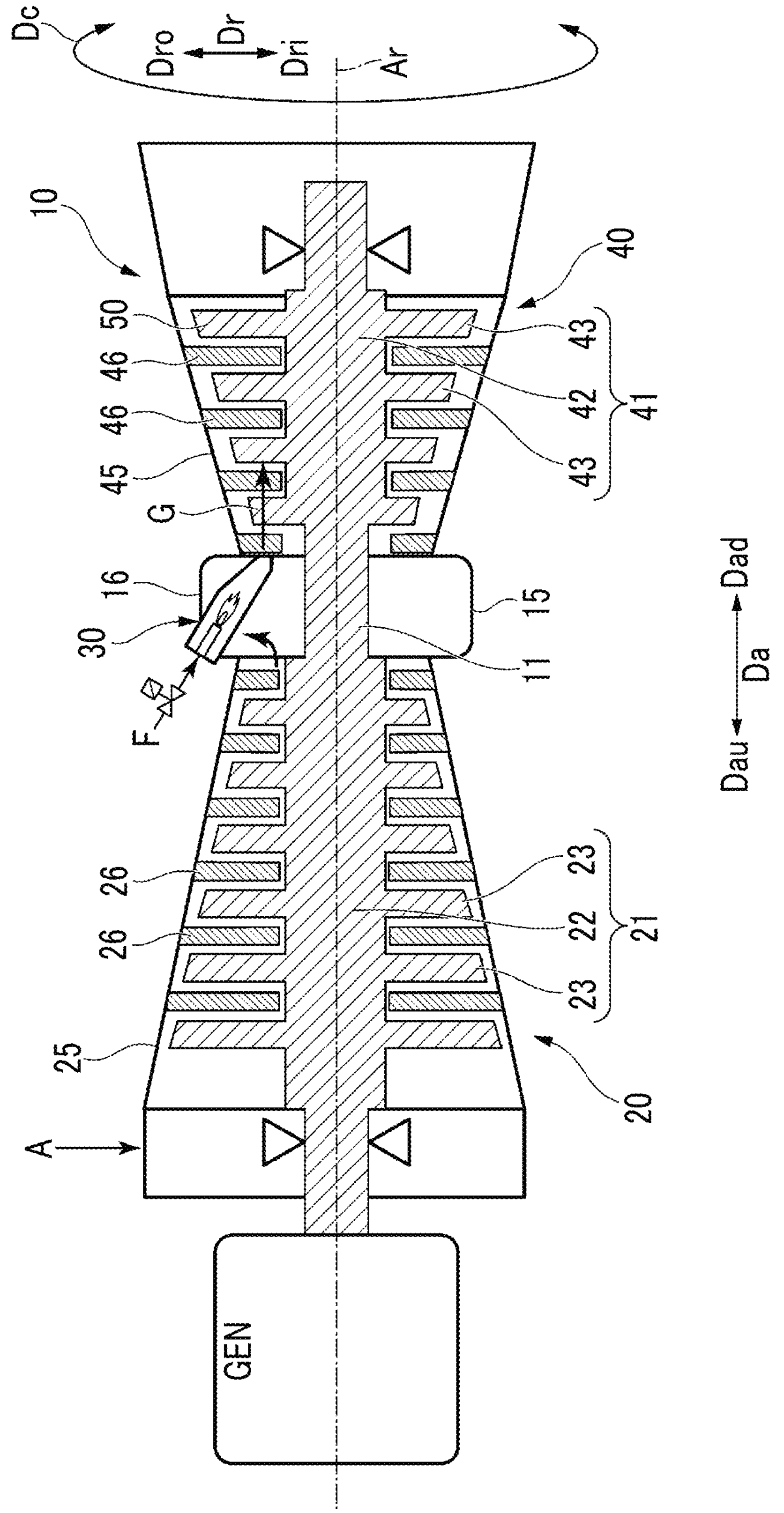
FIG. 1 is a schematic diagram showing a configuration of a gas turbine according to an embodiment of the present disclosure.

DESCRIPTION OF EMBODIMENTS (Configuration of Gas Turbine)

Hereinafter, a gas turbine 10 and a gas turbine blade (a rotor blade 50) according to an embodiment of the present disclosure will be described with reference to FIGS. 1 to 6.

The gas turbine 10 of the present embodiment includes a compressor 20 that compresses air, a combustor 30 that burns fuel F in the air compressed by the compressor 20 to generate a combustion gas G, and a turbine 40 that is driven by the combustion gas G.

The compressor 20 has a compressor rotor 21 that rotates with an axis Ar as the center, a compressor casing 25 that rotatably covers the compressor rotor 21, and a plurality of stator blade stages 26. The turbine 40 has a turbine rotor 41 that rotates with the axis Ar as the center, a turbine casing 45 that rotatably covers the turbine rotor 41, and a plurality of stator blade stages 46.

The compressor rotor 21 and the turbine rotor 41 are located on the same axis Ar and are connected to each other to form a gas turbine rotor 11. For example, a rotor of a generator is connected to the gas turbine rotor 11. Further, the compressor casing 25 and the turbine casing 45 are connected to each other with an intermediate casing 16 interposed therebetween to form a gas turbine casing 15. The combustor 30 is disposed in the intermediate casing 16. Hereinafter, a direction in which the axis Ar extends is referred to as an axial direction Da, a circumferential direction around the axis Ar is simply referred to as a circumferential direction Dc, and a direction perpendicular to the axis Ar is referred to as a radial direction Dr. Further, a compressor 20 side with respect to the turbine 40 in the axial direction Da is referred to as an upstream side, and a side opposite thereto is referred to as a downstream side.

The compressor rotor 21 has a rotor shaft 22 extending in the axial direction Da along the axis Ar, and a plurality of rotor blade stages 23 mounted to the rotor shaft 22. The plurality of rotor blade stages 23 are arranged in the axial direction Da. Each of the rotor blade stages 23 is composed of a plurality of rotor blades 24 arranged in the circumferential direction Dc. The stator blade stage 26 is disposed on the downstream side of each of the plurality of rotor blade stages 23. Each stator blade stage 26 is provided inside the compressor casing 25. Each of the stator blade stages 26 is composed of a plurality of stator blades 27 arranged in the circumferential direction Dc.

The turbine rotor 41 has a rotor shaft 42 extending in the axial direction Da along the axis Ar, and a plurality of rotor blade stages 43 mounted to the rotor shaft 42. The plurality of rotor blade stages 43 are arranged in the axial direction Da. Each of the rotor blade stages 43 is composed of a plurality of rotor blades 50 arranged in the circumferential direction Dc. The stator blade stage 46 is disposed on the upstream side of each of the plurality of rotor blade stages 43. Each stator blade stage 46 is provided inside the turbine casing 45. Each of the stator blade stages 46 is composed of a plurality of stator blades 47 arranged in the circumferential direction Dc. An annular space in a region between an outer periphery side of the rotor shaft 42 and an inner periphery side of the turbine casing 45 and in which the stator blade 47 and the rotor blade 50 are disposed in the axial direction Da forms a combustion gas flow path through which the combustion gas G from the combustor 30 flows.

(Composition of Rotor Blade)

Figure 2:
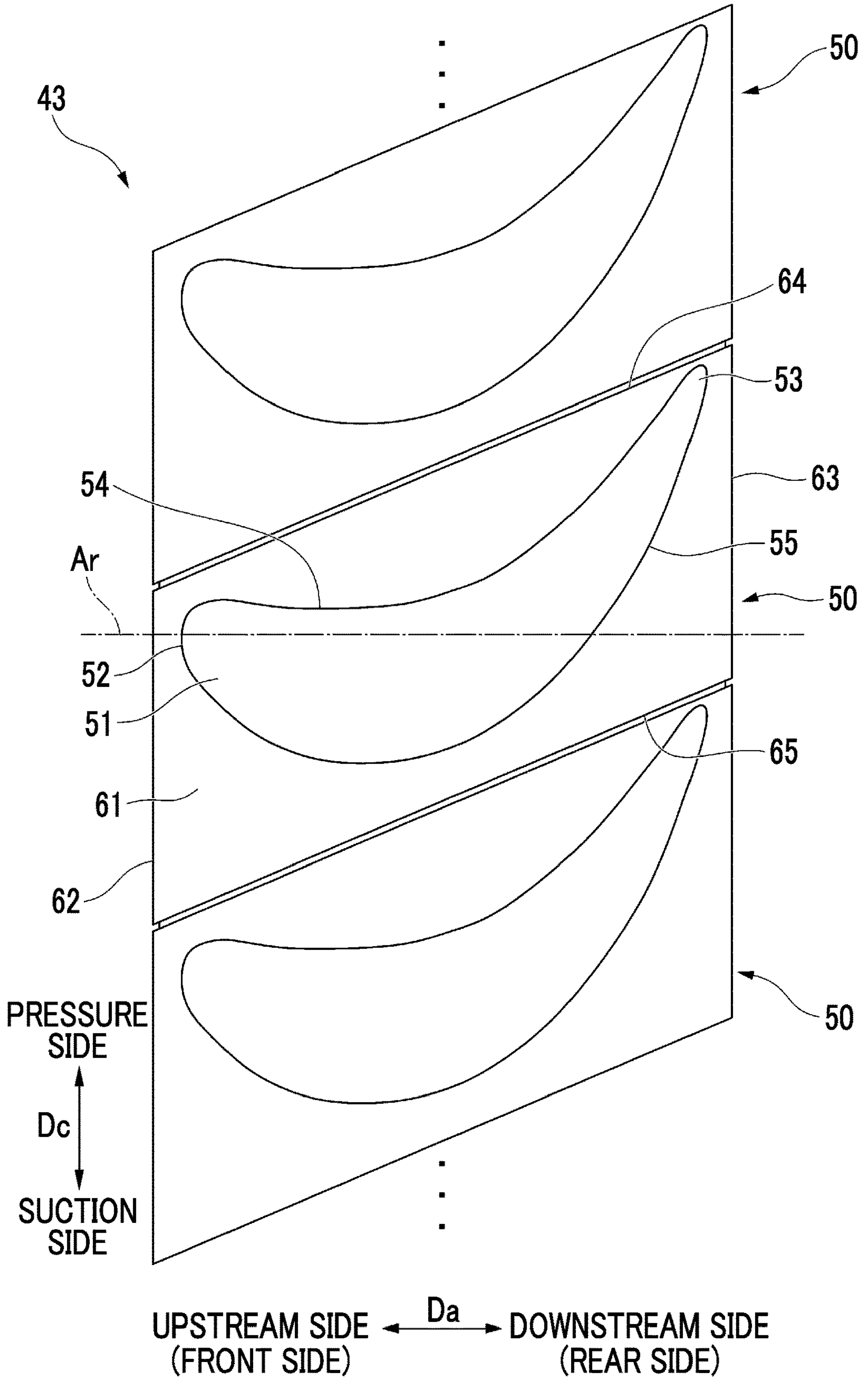
FIG. 2 is a developed diagram of a rotor blade stage according to the embodiment of the present disclosure.
Figure 3:
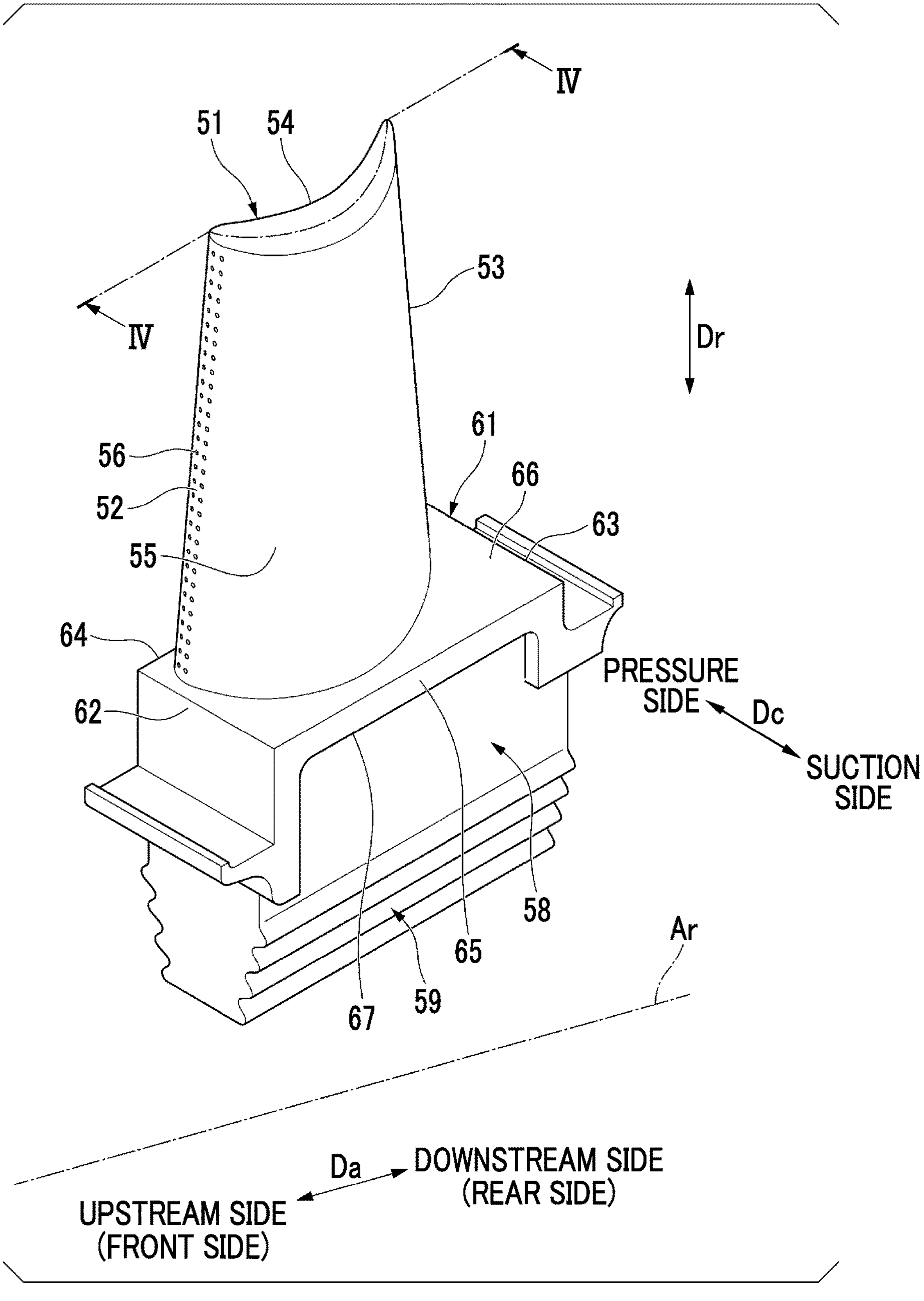
FIG. 3 is a perspective view showing a configuration of a rotor blade (gas turbine blade) according to the embodiment of the present disclosure.

As shown in FIGS. 2 and 3, the rotor blade 50 includes a blade body 51 (a blade main body) extending in the radial direction Dr, a platform 61 (a platform part) formed radially inside the blade body 51, a shank 58 formed radially inside the platform 61, and a blade root 59 provided radially inside the shank 58. A region radially outside the platform 61, that is, a region where the blade body 51 is present, forms a combustion gas flow path through which the combustion gas G from the combustor 30 passes.

The blade body 51 has a leading edge 52 that is an end portion on the upstream side in the axial direction, and a trailing edge 53 that is an end portion on the downstream side in the axial direction. The blade body 51 has a smooth convex shape toward one side in the circumferential direction Dc. A convex surface of surfaces facing the circumferential direction Dc in a surface of the blade body 51 forms a suction side surface (=suction surface) 55, and a concave surface forms a pressure side surface (=pressure surface) 54. For the convenience of the following description, a pressure side (=pressure surface side) of the blade body 51 in the circumferential direction Dc is defined as a pressure side in the circumferential direction, and a suction side (=suction surface side) of the blade body 51 is defined as a suction side in the circumferential direction. Further, the upstream side in the axial direction Da may be called a front side, and the downstream side in the axial direction Da may be called a rear side.

The blade root 59 has a Christmas tree shape in which a wide width portion and a narrow width portion are alternately repeated toward an inner side in the radial direction in a cross-sectional shape perpendicular to a blade chord of the blade body 51. A blade root groove into which the blade root 59 is fitted is formed in the rotor shaft 42 described above.

The platform 61 is formed with a front end surface 62 that is an end surface on the upstream side in the axial direction, a rear end surface 63 that is an end surface on the downstream side in the axial direction, a pressure side end surface 64 that is an end surface on the pressure side in the circumferential direction, and a suction side end surface 65 that is an end surface on the suction side in the circumferential direction. In a case of being viewed from the radial direction Dr, the platform 61 has a parallelogram shape, as shown in FIG. 2. In the platforms 61 of the rotor blades 50 adjacent to each other in the circumferential direction Dc, the pressure side end surface 64 of the platform 61 on one side and the suction side end surface 65 of the platform 61 on the other side face each other. Further, the platform 61 is formed with a gas pass surface 66 (an upper surface), which is a surface on an outer side in the radial direction, and an inner side surface 67, which is a surface on the inner side in the radial direction. The gas pass surface 66 forms a part on the inner side in the radial direction of a surface that defines the combustion gas flow path, and comes into contact with a high-temperature combustion gas.

(Composition of Blade Air Passage)

Figure 4:
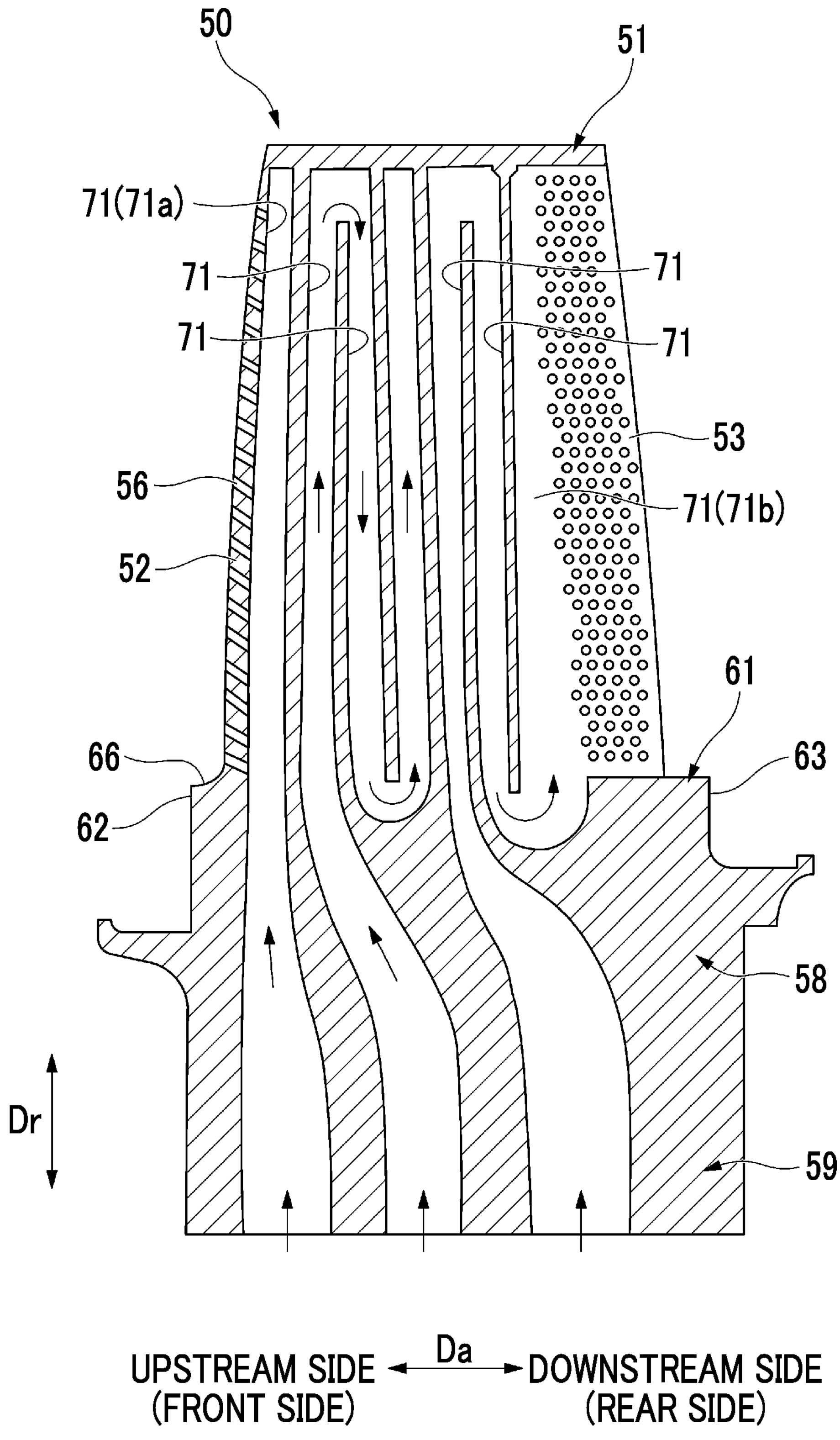
FIG. 4 is a sectional view taken along line IV-IV of FIG. 3.

As shown in FIG. 4, the rotor blade 50 is formed with a plurality of blade air passages 71 (cooling passages) extending in the radial direction Dr. As an example, seven blade air passages 71 are formed in the rotor blade 50 of the present embodiment. Although an example is shown in which the number of blade air passages 71 is seven, the present invention is not limited to this. Each of the blade air passages 71 is formed to extend from at least the blade body 51 among the blade body 51, the platform 61, the shank 58, and the blade root 59 to the platform 61. The plurality of blade air passages 71 are arranged along the blade chord of the blade body 51. Portions of the blade air passages 71 adjacent to each other communicate with each other at a portion on the outer side in the radial direction within the blade body 51 or at a portion on the inner side in the radial direction of the platform 61. Further, any one of the plurality of blade air passages 71 is formed to extend over the blade body 51, the platform 61, the shank 58, and the blade root 59, and is open at an end on the inner side in the radial direction of the blade root 59. Compressed air generated by the compressor 20 flows through the blade air passages 71 as a cooling medium.

The blade body 51 is formed with a blade front end passage 56 which extends from a first blade air passage **71*a* on a most upstream side among the plurality of blade air passages 71 to the upstream side and is open at the leading edge 52 of the blade body 51. Some of the cooling air that has flowed into the first blade air passage 71*a* flows out from the plurality of blade front end passages 56 of the blade body 51 into the combustion gas flow path. Further, some of the cooling air flows out from a seventh blade air passage 71*b* on a most downstream side of the blade air passages 71 into the combustion gas flow path. The leading edge 52 and trailing edge 53 of the blade body 51** are cooled by the cooling air.

(Configurations of Pressure Surface-Side Passage and First Ejection Port)

Figure 5:
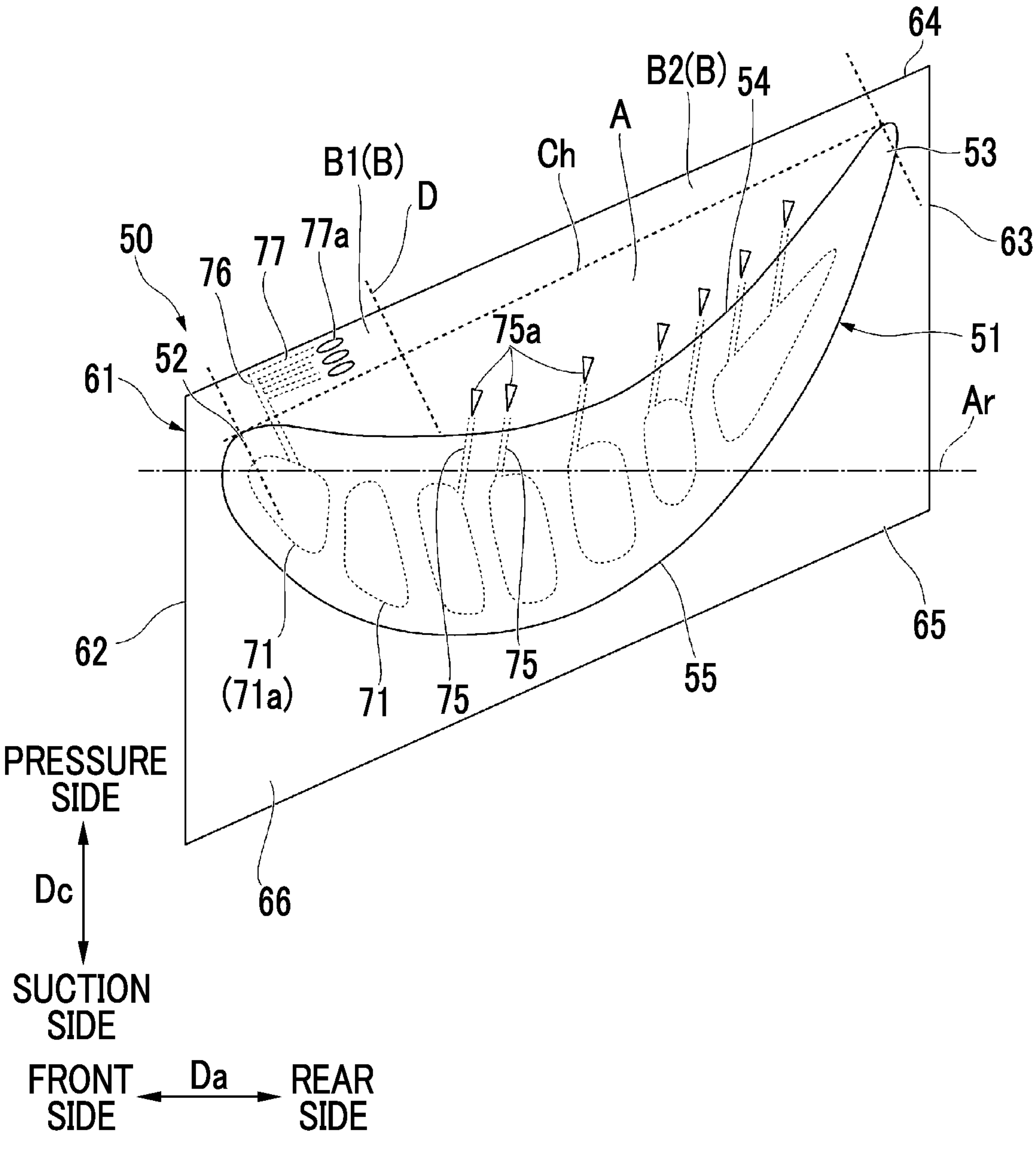
FIG. 5 is a plan view of the rotor blade according to the embodiment of the present disclosure.

As shown in FIG. 5, the platform 61 is formed with a plurality of pressure surface-side passages 75 extending from the blade air passages 71 toward the gas pass surface 66. The pressure surface-side passage 75 forms a part of the cooling passage. The pressure surface-side passages 75 extend parallel to each other toward the pressure side in the circumferential direction of the blade body 51. The term "parallel" as referred to herein means substantially parallel, and design tolerances or manufacturing errors are allowed. One end of each pressure surface-side passage 75 is a first ejection port **75*a* that is open on the gas pass surface 66. The first ejection ports 75*a* are arranged in a curved line shape to follow the shape of the pressure surface of the blade body 51. In the present embodiment, as an example, seven first ejection ports 75*a* are formed. The number of the first ejection ports 75*a*** can be appropriately changed according to design or specifications.

Here, in the gas pass surface 66, a region on a blade body 51 side with respect to a blade chord Ch with a line (the blade chord Ch) connecting the leading edge 52 and the trailing edge 53 of the blade body 51 as a reference is defined as a chord inside region A. Further, in the gas pass surface 66, a region that is located on a side opposite the chord inside region A with the blade chord Ch as a reference is defined as a chord outside region B. At this time, all the first ejection ports 75*a* described above are located within the chord inside region A. That is, all the first ejection ports 75*a* are disposed closer to the blade body 51 than the blade chord Ch is.

Further, the chord outside region B is divided into a chord outside leading edge region B1 that is located on a leading edge 52 side with respect to a dividing line D and a chord outside trailing edge region B2 that is located on a trailing edge 53 side, by the dividing line D perpendicular to the blade chord Ch. The position of the dividing line D is appropriately set within a range of 50% or less from the leading edge 52 in a case where the length of the blade chord Ch is set to 100%. An opening direction of the first ejection port 75*a* described above is determined so as to eject a gas from the chord inside region A toward the chord outside trailing edge region B2.

(Configurations of Leading Edge-Side Passage, Branch Passage, and Second Ejection Port)

A leading edge-side passage 76 is connected to the first blade air passage 71*a* that is located closest to the leading edge 52 side, among the blade air passages 71. The leading edge-side passage 76 extends from the first blade air passage 71*a* toward the chord outside leading edge region B1 described above. Further, a plurality of (as an example, three) branch passages 77 are connected to the middle of the leading edge-side passage 76. The leading edge-side passage 76 and the branch passage 77 serve as a part of the cooling passage.

Each branch passage 77 extends in a direction along the blade chord Ch from the leading edge-side passage 76. One end of the branch passage 77 is a second ejection port 77*a* that is open on the chord outside leading edge region B1. As an example, the positions of the second ejection ports 77*a* in the direction of the blade chord Ch are the same and are within a range of 25% or less of the length of the blade chord Ch from the leading edge 52 in the blade chord Ch. An opening direction of each second ejection port 77*a* is determined so as to eject a gas toward the chord outside trailing edge region B2. In other words, compared to the first ejection port 75*a*, the second ejection port 77*a* is open in the direction along the blade chord Ch.

It is possible to adopt a configuration in which the second ejection port 77*a* is formed in the chord outside trailing edge region B2 as well. However, in this case, a configuration is made such that the number of the second ejection ports 77*a* that are formed in the chord outside leading edge region B1 is greater than the number of the second ejection ports 77*a* that are formed in the chord outside trailing edge region B2. That is, it is desirable that the second ejection ports 77*a* are disposed to be localized on a chord outside leading edge region B1 side. Further, the number of the second ejection ports 77*a* is smaller than the number of the first ejection ports 75*a*.

(Configurations of Side Passage and Third Ejection Port)

Figure 6:
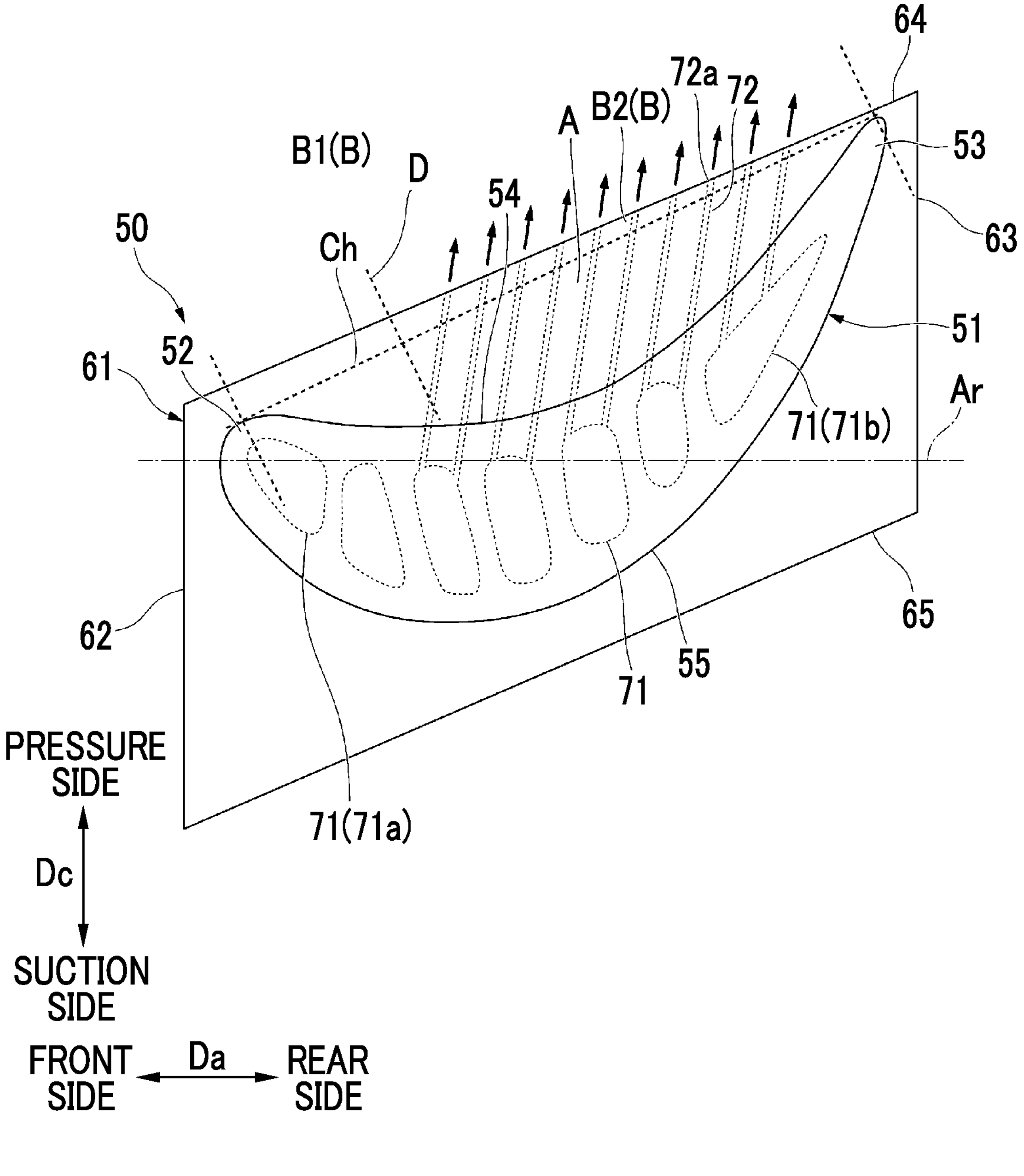
FIG. 6 is a sectional view of a platform part according to the embodiment of the present disclosure.

As shown in FIG. 6, a plurality of side passages 72 extending from some blade air passages 71 are formed inside the platform 61. More specifically, the side passages 72 are formed in some of the blade air passages 71 that are located on the leading edge 52 side, and in the blade air passages 71 that are located on the trailing edge 53 side. Further, the side passages 72 are formed more on a chord outside trailing edge region B2 side than on the chord outside leading edge region B1 side. It is also possible to form the side passages 72 only in the chord outside trailing edge region B2. In the present embodiment, as an example, two side passages 72 are connected to one blade air passage 71. The side passages 72 extend from the blade air passages 71 toward the pressure side end surface 64. An end portion of each side passage 72 is a third ejection port 72*a*.

(Operation and Effects)

Here, in a partial region of the platform 61 away from the blade body 51 (specifically, a part of a region outside the blade chord connecting the leading edge and the trailing edge of the blade main body part) in the gas pass surface 66, the thickness thereof is thinner as compared with the region close to the blade body 51, so that thermal stress due to a high-temperature combustion gas easily occurs. There is a concern that forming many opening end portions of the cooling passages in such a region may lead to a decrease in the fatigue strength of the platform 61.

There is also a case where in the vicinity of the pressure side end surface 64 that is in contact with the suction side end surface 65 of the adjacent platform 61, the vicinity of the end surface is partially thickened in order to enhance the sealing performance between the platforms 61. However, since a part of the region outside the blade chord Ch is thin as compared to the region in the vicinity of the blade body 51, if many opening end portions of the cooling passages are formed in the chord outside region, it leads to a decrease in the fatigue strength of the platform 61.

In the present embodiment, by forming the first ejection port 75*a* in the region close to the blade body 51, it is possible to minimize the influence on the strength. Further, in the chord outside region B, the number of the second ejection ports 77*a* is greater in the chord outside leading edge region B1 than in the chord outside trailing edge region B2. In other words, in the chord outside region B, the second ejection ports 77*a* are disposed to be localized on the leading edge 52 side as compared with the first ejection port 75*a* in the chord inside region A. In this way, it is possible to minimize the influence on the structural strength as compared with, for example, a case where the second ejection ports 77*a* are evenly formed in the chord outside region B.

Further, according to the above configuration, the number of the second ejection ports 77*a* in the chord outside region B is smaller than the number of the first ejection ports 75*a* in the chord inside region A. Since the chord outside region B is thinner than the region close to the blade body 51, by reducing the number of the second ejection ports 77*a*, it is possible to further minimize the influence on the structural strength.

In addition, according to the above configuration, the second ejection port 77*a* formed in the chord outside leading edge region B1 ejects a gas toward the chord outside trailing edge region B2. In this way, it is possible to efficiently cool the surface of the chord outside trailing edge region B2 in which the number of the second ejection ports 77*a* is small.

Further, according to the above configuration, the first ejection port 75*a* ejects a gas toward the chord outside trailing edge region B2. In this way, it is possible to efficiently cool the surface of the chord outside trailing edge region B2 in which the number of the second ejection ports 77*a* is small.

Further, according to the above configuration, the second ejection port 77*a* is open in the direction along the blade chord Ch as compared with the first ejection port 75*a*. Therefore, it is possible to actively perform film cooling on the chord outside trailing edge region B2 by means of the gas that is supplied from the second ejection port 77*a*.

Furthermore, according to the above configuration, the plurality of first ejection ports 75*a* are arranged along the shape of the pressure side surface 54 of the blade main body part. That is, the first ejection ports 75*a* are arranged along the shape of the portion where the platform 61 and the blade body 51 are in contact with each other. Since such a portion has a higher strength than the region close to the blade chord, it is possible to further minimize the influence of the formation of the first ejection port 75*a* on the strength.

Further, according to the above configuration, the side passages 72 communicating with the third ejection ports 72*a* are formed more on the chord outside trailing edge region B2 side than on the chord outside leading edge region B1 side. Therefore, the convective cooling effect of the side passages 72 passing through the inside can be applied to the chord outside trailing edge region B2 in which the number of the second ejection ports 77*a* is small and the cooling effect is difficult to achieve. As a result, it becomes possible to more efficiently cool the chord outside trailing edge region B2.

The embodiment of the present disclosure has been described above. Various changes and modifications can be made to the above configuration within a scope which does not depart from the gist of the present disclosure. For example, the number or shape of the blade air passages 71 described in the above embodiment is an example, and can be appropriately changed according to design or specifications. Further, it is also possible to form other cooling passages communicating with the blade air passages 71.

Additional Remarks

The gas turbine blade (the rotor blade 50) described in each embodiment is understood as follows, for example.

(1) A gas turbine blade (the rotor blade 50) according to a first aspect includes: the platform part (the platform 61) having the cooling passage (the blade air passage 71) formed inside; and the blade main body part (the blade body 51) protruding from the upper surface (the gas pass surface 66) of the platform part, in which the plurality of first ejection ports 75*a* that eject the gas supplied from the cooling passage are formed in the chord inside region A of the upper surface, which is located on the blade main body part side with respect to the blade chord Ch connecting the leading edge 52 and the trailing edge 53 of the blade main body part, the plurality of second ejection ports 77*a* that eject the gas supplied from the cooling passage are formed in the chord outside region B of the upper surface, which is located on the side opposite the chord inside region A with the blade chord Ch as a reference, the chord outside region B has the chord outside leading edge region B1 that is located on the leading edge 52 side, and the chord outside trailing edge region B2 that is located on the trailing edge 53 side, and the plurality of second ejection ports 77*a* are formed more on the chord outside leading edge region B1 than on the chord outside trailing edge region B2.

Here, the chord inside region A, which is located closer to the blade main body side than the blade chord Ch is, is thicker than the chord outside region B, so that the chord inside region A has relatively high strength and is less affected by thermal stress. The first ejection port 75*a* is formed in such a region, so that it is possible to minimize the influence on the strength. Further, in the chord outside region B, the number of the second ejection ports 77*a* is greater in the chord outside leading edge region B1 than in the chord outside trailing edge region B2. In other words, in the chord outside region B, the second ejection ports 77*a* are disposed to be localized on the leading edge 52 side as compared with the first ejection port 75*a* in the chord inside region A. In this way, it is possible to minimize the influence on the structural strength as compared with, for example, a case where the second ejection ports 77*a* are evenly formed in the chord outside region B.

(2) In a gas turbine blade according to a second aspect, the number of the second ejection ports 77*a* may be smaller than the number of the first ejection ports 75*a*.

According to the above configuration, the number of the second ejection ports 77*a* in the chord outside region B is smaller than the number of the first ejection ports 75*a* in the chord inside region A. Since the chord outside region B is thinner than the region close to the blade body 51, by reducing the number of the second ejection ports 77*a*, it is possible to further minimize the influence on the structural strength.

(3) In a gas turbine blade according to a third aspect, the position of the second ejection port 77*a* may be within a range of 25% or less of the length of the blade chord Ch with the leading edge 52 in a direction along the blade chord Ch as a reference in the chord outside leading edge region B1.

According to the above configuration, the position of the second ejection port 77*a* is provided within the range of 25% or less of the length of the blade chord with the leading edge 52 as a reference with respect to the direction of the blade chord Ch in the chord outside leading edge region B1. In this way, it is possible to further minimize the influence on the structural strength.

(4) In a gas turbine blade according to a fourth aspect, the second ejection port 77*a* formed in the chord outside leading edge region B1 among the plurality of second ejection ports 77*a* may be configured to eject the gas toward the chord outside trailing edge region B2.

According to the above configuration, the second ejection ports 77*a* formed in the chord outside leading edge region B1 eject the gas toward the chord outside trailing edge region B2. In this way, it is possible to efficiently cool the surface of the chord outside trailing edge region B2 in which the number of the second ejection ports 77*a* is small.

(5) In a gas turbine blade according to a fifth aspect, the plurality of first ejection ports 75*a* may be configured to eject the gas toward the chord outside trailing edge region B2.

According to the above configuration, the first ejection ports 75*a* eject the gas toward the chord outside trailing edge region B2. In this way, it is possible to efficiently cool the surface of the chord outside trailing edge region B2 in which the number of the second ejection ports 77*a* is small.

(6) In a gas turbine blade according to a sixth aspect, compared to the first ejection port 75*a*, the second ejection port 77*a* may be open in a direction along the blade chord Ch.

According to the above configuration, compared with the first ejection port 75*a*, the second ejection port 77*a* is open in the direction along the blade chord Ch. Therefore, it is possible to actively perform film cooling on the chord outside trailing edge region B2 by means of the gas that is supplied from the second ejection port 77*a*.

(7) In a gas turbine blade according to a seventh aspect, the plurality of first ejection ports 75*a* may be arranged along the shape of the pressure surface (the pressure side surface 54) of the blade main body part.

According to the above configuration, the plurality of first ejection ports 75*a* are arranged along the shape of the pressure surface of the blade main body part. That is, the first ejection ports 75*a* are arranged along the shape of the portion where the platform part and the blade main body part are in contact with each other. Since such a portion has a high strength, it is possible to further minimize the influence of the formation of the first ejection port 75*a* on the strength.

(8) In a gas turbine blade according to an eighth aspect, the plurality of third ejection ports 72*a* for ejecting the gas supplied from the cooling passage may be formed in the side end surface (the pressure side end surface 64) of the platform part, and the cooling passages (the side passages 72) communicating with the plurality of third ejection ports 72*a* may be formed more on the chord outside trailing edge region B2 side than on the chord outside leading edge region B1 side.

According to the above configuration, the cooling passages 72 communicating with the third ejection ports 72*a* are formed more on the chord outside trailing edge region B2 side than on the chord outside leading edge region B1 side. Therefore, the convective cooling effect of the cooling passages (the side passages 72) passing through the inside can be applied to the chord outside trailing edge region B2 in which the number of the second ejection ports 77*a* is small and the cooling effect is difficult to achieve. As a result, it becomes possible to more efficiently cool the chord outside trailing edge region B2.

INDUSTRIAL APPLICABILITY

According to the present disclosure, it is possible to provide a gas turbine blade having further improved fatigue strength.

REFERENCE SIGNS LIST

10: Gas turbine
11: Gas turbine rotor
15: Gas turbine casing
16: Intermediate casing
20: Compressor
21: Compressor rotor
23: Rotor blade stage
24: Rotor blade
25: Compressor casing
26: Stator blade stage
27: Stator blade
30: Combustor
40: Turbine
41: Turbine rotor
42: Rotor shaft
43: Rotor blade stage
45: Turbine casing
46: Stator blade stage
47: Stator blade
50: Rotor blade
51: Blade body
52: Leading edge
53: Trailing edge
54: Pressure side surface
55: Suction side surface
58: Shank
59: Blade root
61: Platform
62: Front end surface
63: Rear end surface
64: Pressure side end surface
65: Suction side end surface
66: Gas pass surface
67: Inner side surface
71: Blade air passage
71*a*: First blade air passage
71*b*: Seventh blade air passage
72: Side passage
72*a*: Third ejection port
75: Pressure surface-side passage
75*a*: First ejection port
76: Leading edge-side passage
77: Branch passage
77*a*: Second ejection port
A: Chord inside region
B: Chord outside region
B1: Chord outside leading edge region
B2: Chord outside trailing edge region
Ch: Blade chord
D: Dividing line

The invention claimed is:

1. A gas turbine blade comprising:

a platform part having a cooling passage formed inside; and a blade main body part protruding from an upper surface of the platform part, wherein a chord is a straight line connecting a leading edge of the blade main body part and a trailing edge of the blade main body part, the upper surface of the platform part having a chord inside region located on a blade main body part side with respect to the chord, and having a chord outside region located on a side of the chord opposite the chord inside region, wherein the cooling passage of the platform part has a plurality of pressure surface-side passages extending toward the upper surface of the platform part, a leading edge-side passage extending toward the chord outside region, and a plurality of branch passages extending along the blade chord from the leading edge-side passage, wherein a plurality of first ejection ports configured to eject a gas supplied from the pressure surface-side passages are formed in the chord inside region of the upper surface, wherein a plurality of second ejection ports configured to eject the gas supplied from the leading edge-side passage and the branch passages are formed in the chord outside region of the upper surface, wherein the chord outside region has a chord outside leading edge region located on a leading edge side, and a chord outside trailing edge region located on a trailing edge side, and wherein a larger quantity of the plurality of second ejection ports are formed on the chord outside leading edge region than on the chord outside trailing edge region.

2. The gas turbine blade according to claim 1, wherein a quantity of the second ejection ports is smaller than a quantity of the first ejection ports.

3. The gas turbine blade according to claim 1, wherein positions of the second ejection ports are within a range of 25% or less of a length of the chord from the leading edge in a direction along the chord in the chord outside leading edge region.

4. The gas turbine blade according to claim 1, wherein the second ejection ports formed in the chord outside leading edge region are configured to eject the gas toward the chord outside trailing edge region.

5. The gas turbine blade according to claim 1, wherein the plurality of first ejection ports are configured to eject the gas toward the chord outside trailing edge region.

6. The gas turbine blade according to claim 1, wherein the second ejection ports are open in a direction along the chord, and the first ejection ports are open in a direction intersecting the chord.

7. The gas turbine blade according to claim 1, wherein the plurality of first ejection ports are arranged along a pressure surface of the blade main body part.

8. The gas turbine blade according to claim 1, wherein the cooling passage further comprises a plurality of side passages extending toward a side end surface of the platform part, wherein a plurality of third ejection ports for ejecting the gas supplied from the side passages of the cooling passage are formed in the side end surface of the platform part, and wherein a larger quantity of the side passages of the cooling passage communicating with the plurality of third ejection ports are formed on the chord outside trailing edge region than on the chord outside leading edge region.

* * * * *